(12) United States Patent
Dormidontov et al.

(10) Patent No.: US 11,714,871 B2
(45) Date of Patent: Aug. 1, 2023

(54) METHOD AND SYSTEM FOR RANKING A WEB RESOURCE

(71) Applicant: YANDEX EUROPE AG, Lucerne (CH)

(72) Inventors: Sergey Igorevich Dormidontov, Moscow (RU); Kirill Valerievich Nikolaev, Tula (RU)

(73) Assignee: YANDEX EUROPE AG, Lucerne (CH)

( * ) Notice: Subject to any disclaimer, the term of this patent is extended or adjusted under 35 U.S.C. 154(b) by 168 days.

(21) Appl. No.: 17/386,814

(22) Filed: Jul. 28, 2021

(65) Prior Publication Data

US 2022/0197967 A1 Jun. 23, 2022

(30) Foreign Application Priority Data

Dec. 22, 2020 (RU) .......................... RU2020142447

(51) Int. Cl.
*G06F 16/90* (2019.01)
*G06N 20/00* (2019.01)
*G06F 16/9538* (2019.01)

(52) U.S. Cl.
CPC ......... *G06F 16/9538* (2019.01); *G06N 20/00* (2019.01)

(58) Field of Classification Search
CPC .................................................. G06F 16/9538
See application file for complete search history.

(56) References Cited

U.S. PATENT DOCUMENTS

| | | |
|---|---|---|
| 2013/0086083 A1 | 4/2013 | Zou et al. |
| 2017/0185602 A1 | 6/2017 | Gusev et al. |
| 2018/0373723 A1 | 12/2018 | Levi et al. |
| 2020/0110754 A1* | 4/2020 | Lamburt ............ G06F 16/24578 |
| 2020/0192904 A1* | 6/2020 | Safronov ........... G06F 16/24539 |
| 2021/0056115 A1* | 2/2021 | Shaw ................. G06F 16/24556 |

* cited by examiner

*Primary Examiner* — Kristopher Andersen
(74) *Attorney, Agent, or Firm* — BCF LLP

(57) ABSTRACT

There is disclosed a method and system for ranking a web resource. The method comprises: receiving a set of features associated with the web resource; generating a raw quality score based on the set of features, comparing the raw quality score to a reference score, the reference score being associated with a similar level of user traffic as the web resource; applying an offset adjustment formula to the raw quality score in response to an offset between the raw quality score and the reference score to obtain an adjusted quality score; in response to receiving a query, generating a search engine result page (SERP) including an indication of the web resource at a ranked position based on the adjusted quality score, the adjusted quality score causing a future raw quality score to be closer to a future reference score associated with a future level of user traffic.

18 Claims, 7 Drawing Sheets

METHOD AND SYSTEM FOR RANKING A WEB RESOURCE

CROSS-REFERENCE

The present application claims priority to Russian Patent Application No. 2020142447, entitled "METHOD AND SYSTEM FOR RANKING A WEB RESOURCE," filed on Dec. 22, 2020, the entirety of which is incorporated herein by reference.

FIELD

The present technology generally relates to methods and systems for ranking a web resource, more particularly, to a system and method for ranking a web resource by a search engine.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

United States Patent Publication No. 2018/373723 A1 entitled "Method and System for Applying a Machine Learning Approach to Ranking webpages' performance relative to their nearby peers" published on Dec. 27, 2018 and assigned to Unbounce Marketing Solutions Inc., discloses a cloud-based, machine learning method and system to compare, rank and/or predict an example webpage's performance (such as conversion rate for webpages in an online marketing campaign) relative to its closest peers. The closest peers are selected from a sample set of webpages for which performance is known. A topic model is constructed from a modeling set of webpages, based on their content. A topic vector for the example webpage and for each webpage in the sample set is determined based upon the constructed topic model. The example webpage's closest peers are determined by the distance/similarity measure between the topic vector of the example webpage and of each webpage of the sample set. The method and system can be applied to one or a plurality of example webpages in order to assess webpages that are underperforming relative to their closest peers.

United States Patent Publication No. 2017/185602 A1 entitled "System and Method for Ranking Search Engine Results" published on Jun. 29, 2017 and assigned to Yandex Europe AG, discloses methods and systems for generating a search engine results page (SERP). The method is executable at a server executing a search engine, the server being accessible via a communication network by at least one electronic device. The method comprises, as part of generating a search result list, the search result list containing a first search result and a second search result, predicting a first interest parameter for the first search result; predicting a second interest parameter for the second search result; predicting a usefulness parameter for the first search result, the predicting being at least partially based on the first interest parameter and the second interest parameter; adjusting a position of the first search result within the ranked search result list based on the predicted usefulness parameter, the adjusting resulting in the first search result being at an adjusted position within the ranked search result list.

SUMMARY

It is an object of the present technology to provide improved method and systems for ranking a web resource.

New web resources are continuously generated, which makes it difficult for a search engine to properly assess its relevancy to a given query.

For example, a web resource which is fairly new will rarely be ranked at a high position in a search engine result page (SERP) since the search engine application lacks the history (such as the click-through-rate) of the web resource. This can happen even if the web resource being highly relevant to a search query. In other words, developers of the present technology have appreciated that there is a need for a method and system that provides traffic monitoring solutions to properly determine a rank for a web resource.

In accordance with a first broad aspect of the present technology, there is provided a computer-implemented method for ranking a web resource, the method executable by a search engine server, the method comprising, at an in-use phase: receiving, by the server, a set of features including statistical features associated with the web resource; generating, by the server, a raw quality score based on the set of features, the raw quality score being indicative of a perceived quality of the web resource by one or more users; comparing the raw quality score to a reference score, the reference score being associated with a similar level of user traffic as the web resource, the reference score having been determined based on the raw quality scores of a plurality of training web resources; applying, by the server, an offset adjustment formula to the raw quality score in response to an offset between the raw quality score and the reference score to obtain an adjusted quality score; in response to receiving a query, generating by the server, a search engine result page (SERP) including an indication of the web resource at a ranked position based on the adjusted quality score, the adjusted quality score causing a future raw quality score to be closer to a future reference score associated with a future level of user traffic to the web resource.

In some non-limiting embodiments of the method, the generating the raw quality score comprises: executing, by the serer, a set of predictive algorithms, each predictive algorithm configured to generate a predicted feature value for a given feature from the set of features based on a remainder of the features; determining, by the server, a weight value for each predictive algorithm, the web value being indicative of how well a given feature value correlates to the remainder of the features of the set of features; calculating, by the server, the raw quality scores based on the set of features and the associated weight value.

In some non-limiting embodiments of the method, determining the reference score comprises: plotting the raw quality scores of the plurality of training web resources unto a graph in associated with a respective level of traffic; generating a trend curve fitting the set of raw quality scores unto the graph, the trend curve passing through a set of reference scores, the set of reference scores including reference scores at each level of traffic.

In some non-limiting embodiments of the method, the trend curve is based on the formula $f(x)=a*np\cdot\log(b*x+c)$, where: a is a vertical shift parameter; b is a sharpness parameter of the trend curve; c is a horizontal shift parameter.

In some non-limiting embodiments of the method, the offset adjustment formula is: $raw\_score-(1-a)*(f(visitors)-raw\_score)*b/std(raw\_score)*(visitors*c)/(d*10)$, where: raw_score corresponds to the raw quality score; visitors correspond to the monthly user return rate; a, b, c and d are predetermined values.

In some non-limiting embodiments of the method, the set of features comprises at least one of: a quality of the web resource; a monthly user return rate; a long-term attachment of users to the web resource; a percentage of hits with a click length of more than 120 seconds; a number of users per month; a percentage of unique direct hits from mobile devices; a percentage of unique direct hits from desktops; a logarithm of the absolute number of direct sessions from desktops; an average quality of users on the host; and a share of outgoing traffic from the host to an advertisement.

In some non-limiting embodiments of the method, the method further comprising normalizing each feature within the set of features between a value of 0 and 1.

In some non-limiting embodiments of the method, the level of user traffic is measured by one of: monthly active users (MAU); weekly active users (WAU); and daily active users (DAU).

In some non-limiting embodiments of the method, causing the future raw quality score to be closer to the future reference score comprises: in response to the raw quality score being above the reference score, the adjusted quality score causing the ranked position to be below a ranked position associated with the raw quality score; and in response to the raw quality score being below the reference score, the adjusted quality score causing the ranked position to be above the ranked position associated with the raw quality score.

In accordance with another broad aspect of the present technology, there is disclosed a server for ranking a web resource, the server comprising a processor configured to, at an in-use phase: receive, a set of features including statistical features associated with the web resource; generate, a raw quality score based on the set of features, the raw quality score being indicative of a perceived quality of the web resource by one or more users; compare the raw quality score to a reference score, the reference score being associated with a similar level of user traffic as the web resource, the reference score having been determined based on the raw quality scores of a plurality of training web resources; apply an offset adjustment formula to the raw quality score in response to an offset between the raw quality score and the reference score to obtain an adjusted quality score; in response to receiving a query, generate a search engine result page (SERP) including an indication of the web resource at a ranked position based on the adjusted quality score, the adjusted quality score causing a future raw quality score to be closer to a future reference score associated with a future level of user traffic to the web resource.

In some non-limiting embodiments of the server, to generate the raw quality, the processor is configured to: execute a set of predictive algorithms, each predictive algorithm configured to generate a predicted feature value for a given feature from the set of features based on a remainder of the features; determine a weight value for each predictive algorithm, the web value being indicative of how well a given feature value correlates to the remainder of the features of the set of features; calculate the raw quality scores based on the set of features and the associated weight value.

In some non-limiting embodiments of the server, to determine the reference score, the processor is configured to: plot the raw quality scores of the plurality of training web resources unto a graph in associated with a respective level of traffic; generate a trend curve fitting the set of raw quality scores unto the graph, the trend curve passing through a set of reference scores, the set of reference scores including reference scores at each level of traffic.

In some non-limiting embodiments of the server, the trend curve is based on the formula $f(x)=a*np\cdot\log(b*x+c)$, where: a is a vertical shift parameter; b is a sharpness parameter of the trend curve; c is a horizontal shift parameter.

In some non-limiting embodiments of the server, the offset adjustment formula is: $raw\_score-(1-a)*(f(visitors)-raw\_score)*b/std(raw\_score)*(visitors*c)/(d*10)$, where: raw_score corresponds to the raw quality score; visitors correspond to the monthly user return rate; a, b, c and d are predetermined values.

In some non-limiting embodiments of the server, the set of features comprises at least one of: a quality of the web resource; a monthly user return rate; a long-term attachment of users to the web resource; a percentage of hits with a click length of more than 120 seconds; a number of users per month; a percentage of unique direct hits from mobile devices; a percentage of unique direct hits from desktops; a logarithm of the absolute number of direct sessions from desktops; an average quality of users on the host; and a share of outgoing traffic from the host to an advertisement.

In some non-limiting embodiments of the server, the processor being further configured to normalize each feature within the set of features between a value of 0 and 1.

In some non-limiting embodiments of the server, the level of user traffic is measured by one of: monthly active users (MAU); weekly active users (WAU); and daily active users (DAU).

In some non-limiting embodiments of the server, to cause the future raw quality score to be closer to the future reference score, the processor is configured to: in response to the raw quality score being above the reference score, the adjusted quality score causing the ranked position to be below a ranked position associated with the raw quality score; and in response to the raw quality score being below the reference score, the adjusted quality score causing the ranked position to be above the ranked position associated with the raw quality score.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
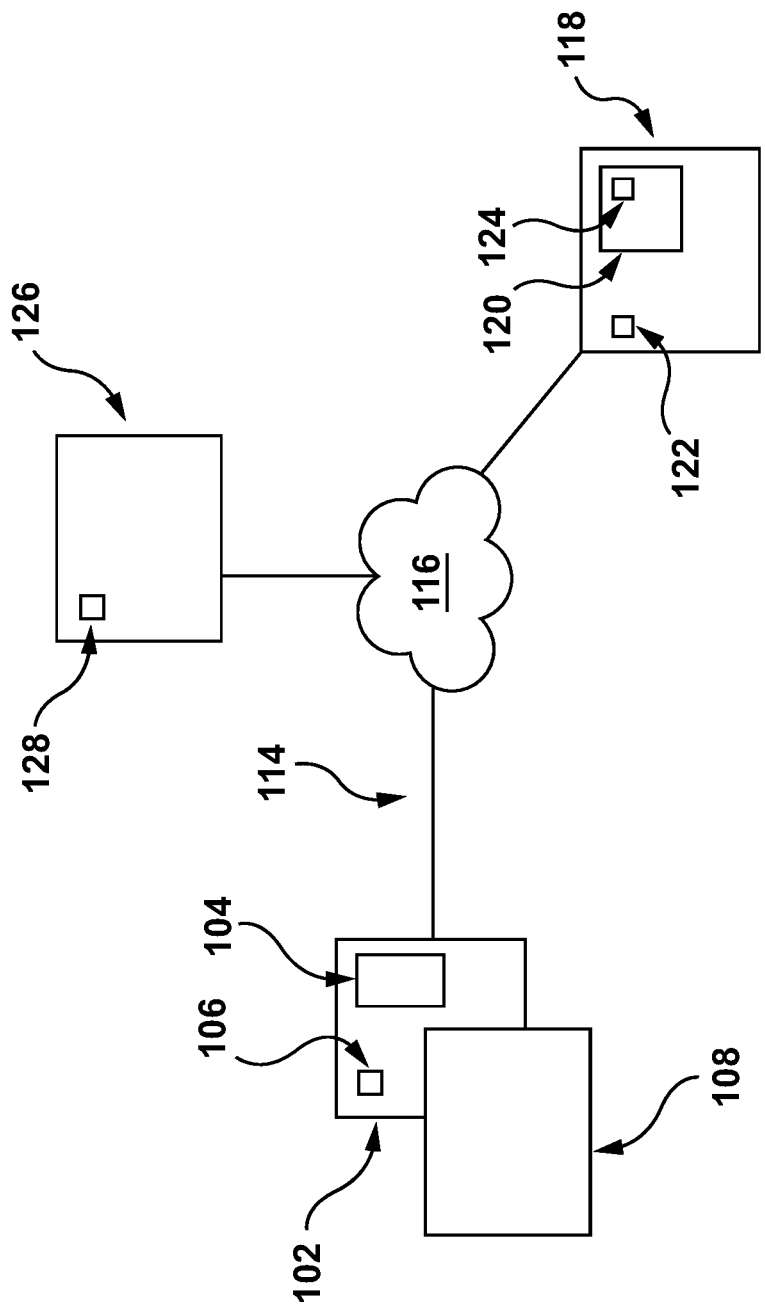
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 includes hardware and/or software and/or firmware (or a combination thereof) to execute a browser application 108. Generally speaking, the purpose of the browser application 108 is to enable the user to navigate the Internet. The manner in which the browser application 108 is implemented is known in the art and will not be described herein. Suffice it to say that the browser application 108 may be implemented as a Yandex™ browser application. It should be expressly understood that any other commercially available or proprietary browser application can be used for implementing non-limiting embodiments of the present technology.

Generally speaking, the electronic device 102 comprises a user input interface (not shown) (such as a keyboard) for receiving user inputs into, for example, a query interface (not shown). How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

The electronic device 102 is coupled to a communication network 116 via a communication link 114. In some non-limiting embodiments of the present technology, the communication network 116 can be implemented as the Internet. In other embodiments of the present technology, the communication network 116 can be implemented differently, such as any wide-area communications network, local-area communications network, a private communications network and the like.

How the communication link 114 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 114 and the communication network 116 are provided for illustration purposes only. As such, those skilled in the art will easily appreciate other specific implementational details for the electronic device 102, the communication link 114 and the communication network 116. As such, by no means, examples provided hereinabove are meant to limit the scope of the present technology.

The system 100 further includes a server 118 coupled to the communication network 116. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 116) via the communication network 116.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments, the server 118 can be operated by the same entity that has provided the afore-described browser application 108. For example, if the browser application 108 is a Yandex.Browser™ application, the server 118 can be operated by Yandex LLC of Lev Tolstoy Street, No. 16, Moscow, 119021, Russia. In alternative embodiments, the server 118 can be operated by an entity different from the one that has provided the aforementioned browser application 108.

In some non-limiting embodiments of the present technology, the server 118 provides a search engine application 124 which is accessible by the browser application 108 via the communication network 116. The manner in which the search engine application 134 is implemented is known in the art and therefore will not be described in detail herein.

Additionally, there is provided a web server 126 coupled to the communication network 116. The web server 126 can (but does not have to) be implemented in a similar manner to the server 118. In the depicted embodiments of the present technology, the web server 126 is a single server. In alternative non-limiting embodiments of the present technology, the functionality of the web server 126 may be distributed and implemented via multiple servers.

In some non-limiting embodiments of the technology, the web server 126 functions as a repository for at least one web resource 128.

In some non-limiting embodiments of the present technology, the web server 126 is configured to store a set of features (discussed below) associated with the web resource 128.

Generally speaking, the user of the electronic device 102 can access the web resource 128 via the communication network 116 by two principle means. The given user can access directly, either by typing an address of the web resource 128 (typically an URL or Universal Resource Locator, such as www.example.com) into a command interface of the browser application 108 or by clicking a link in an e-mail or in another web resource (which action will in a sense "copy" and "paste" the URL associated with the link into the command interface).

Alternatively, the given user may conduct a search using the search engine application 124 executed by the server 118 to locate a resource of interest based on the user's search intent. The latter is particularly suitable in those circumstances, where the given user knows a topic of interest, but does not know the URL of the web resource she or he is interested in. The search engine application 124 typically returns a search engine result page (SERP) containing links to one or more web resources that are responsive to the user query. Again, upon the user clicking one or more links provided within the SERP, the user can open the required web resource.

Figure 2:
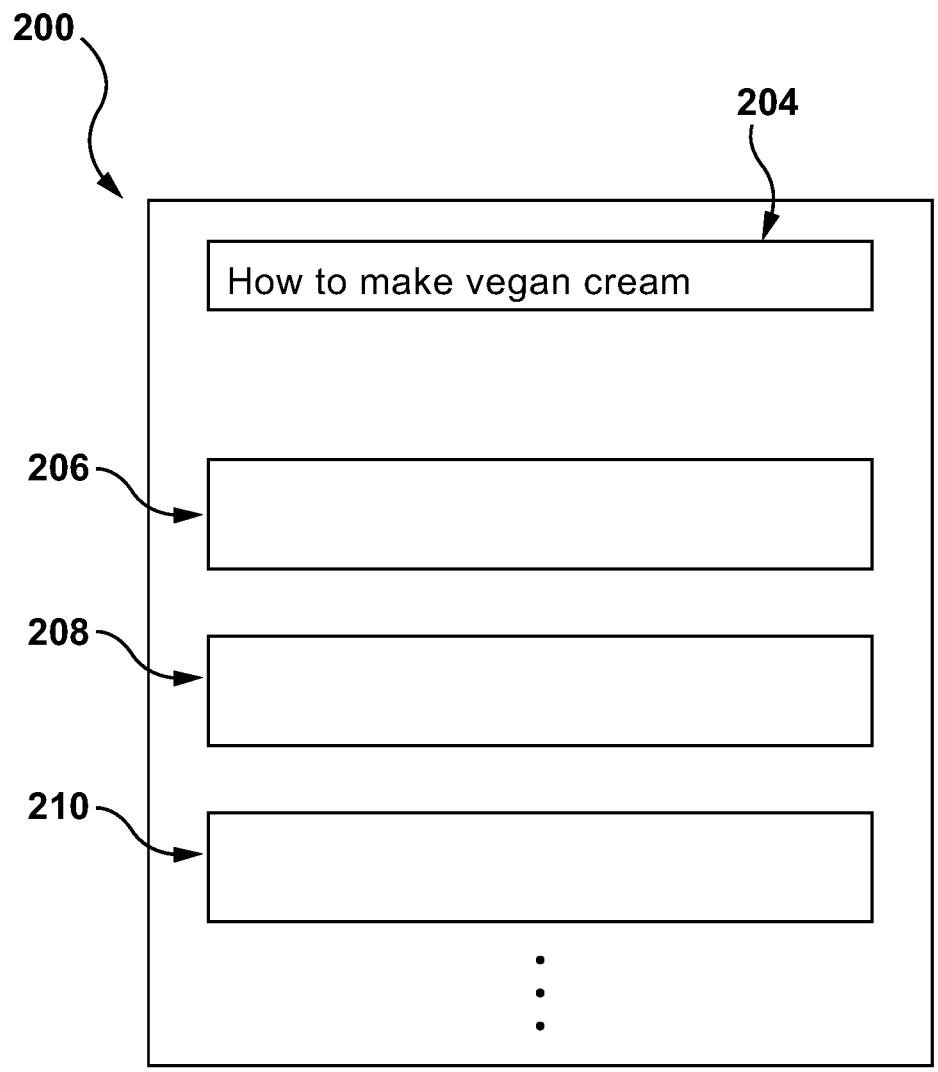
FIG. 2 is a schematic illustration of a search engine result page (SERP) in accordance with non-limiting embodiments of the present technology.

With reference to FIG. 2, there is depicted a non-limiting schematic illustration of a search engine result page (SERP) 200 that is accessed by the browser application 108.

The SERP 200 is generated in response to the browser application 108 submitting a query 204 ("how to make vegan cream") to the search engine application 124. The SERP 200 comprises a plurality of search results, namely a first search result 206, a second search result 208 and a third search result 210 ranked in order of relevancy to the query 204. In other words, the search engine application 124 has determined that the first search result 206 is the most relevant web resource to the query 204, followed by the second search result 208 and the third search result 210. Although only three search results are shown on the SERP 200, this is done for ease of illustration and it should be understood that generally a SERP will contain more than three search results for a given query.

How the search engine application 124 determines the relevancy of the search results is known in the art and therefore will not be described in detail herein. Suffice it to say that the search engine application 124 uses, inter alia, the term frequency of the query (i.e. the number of times a word appears in each web resource, divided by the number of words in the web resource) and the inverse document frequency (i.e. the logarithm of the number of documents divided by the number of documents that contain the word).

Since the ranking of a web resource is determined (at least partially) by the search engine application 124 taking into account the term frequency and the inverse document frequency, it is generally known that some publishers, whether with a malicious intent or not, artificially inflate a web resource (for example, with the use of key terms) in order to push its ranking by the search engine application 124 in order to receive more visitors.

Figure 3:
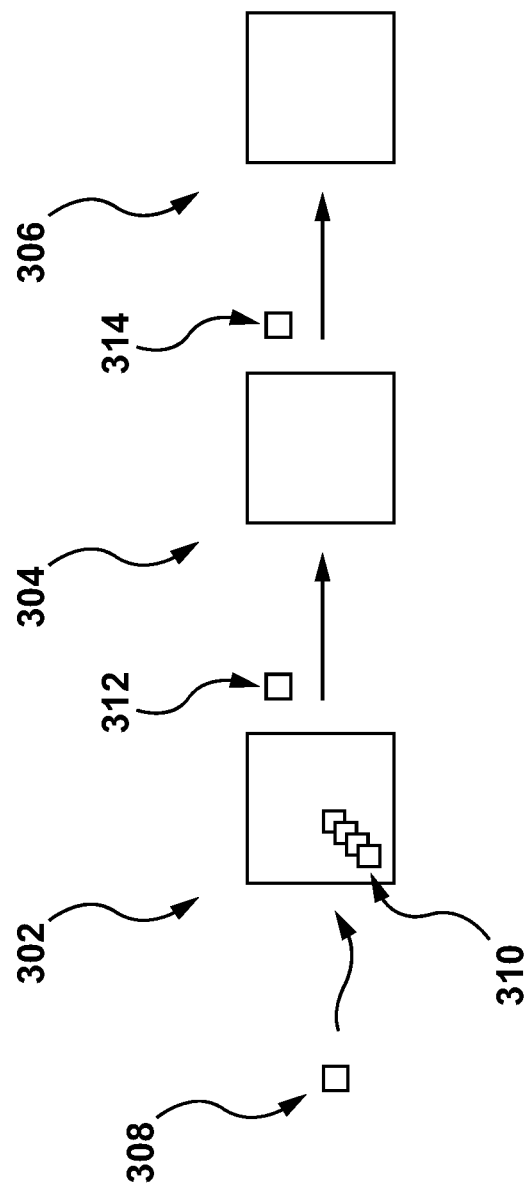
FIG. 3 is a schematic diagram of a process of an application executed in the system of FIG. 1.

Functions and operations of the various components of the search engine application 124 will now be described in greater details. With reference to FIG. 3, there is depicted a schematic illustration of the search engine application 124 for ranking the web resource 128. The search engine application 124 executes (or otherwise has access to): a score determination routine 302, a mapping routine 304 and an adjustment routine 306.

In the context of the present specification, the term "routine" refers to a subset of the computer executable program instructions of the search engine application 124 that is executable by the server processor 122 to perform the functions explained below. For the avoidance of any doubt, it should be expressly understood that the score determination routine 302, the mapping routine 304 and the adjustment routine 306 are illustrated schematically herein in a separate and distributed manner for ease of explanation of the processes executed by the search engine application 124. It is contemplated that some or all of the score determination routine 302, the mapping routine 304 and the adjustment routine 306 may be implemented as one or more combined routines.

For ease of understanding the present technology, functionality of each one of the score determination routine 302, the mapping routine 304 and the adjustment routine 306, as well as data and/or information processed or stored therein during a pre-in-use phase of the search engine application 124 are described below. An in-use phase description of the search engine application 124 will follow.

Score Determination Routine 302

The score determination routine 302 is configured to receive a data packet 308 from the web server 126. The data packet 308 comprises the set of features associated with the web resource 128.

In some non-limiting embodiments of the present technology, the set of features associated with the web resource 128 include one or more of the following:

- a quality of the web resource 128;
- a monthly user return rate;
- a long-term attachment of users to the web resource;

a percentage of hits with a click length of more than 120 seconds;

a number of users per month;

a percentage of unique direct hits from mobile devices;

a percentage of unique direct hits from desktops;

a logarithm of the absolute number of direct sessions from desktops;

an average quality of users on the web resource 128; and a share of outgoing traffic from the web resource 128 to an advertisement web resource For ease of understanding, an explanation of each of the feature is presented below.

Quality of the Web Resource 128

The quality of links of the web resource 128 is indicative of a trust parameter that is assigned to the web resource 128. How the trust parameter is assigned to the web resource 128 is not limited. In some non-limiting embodiments of the present technology, the trust parameter is determined based on a whitelist of web resources compiled by one or more operators of the search engine application 124.

Monthly User Return Rate

The monthly user return rate corresponds to a ratio of a number of users that accesses the web resource 128 multiple times within a month vis-a-vis a total number of user visits.

Long-Term Attachment of Users to the Web Resource 128

The long-term attachment of users to the web resource 128 is indicative of a number of users that accesses the web resource 128 over a predetermined period (such as three months). The long-term attachment of users to the web resource 128 may correspond to a ratio between a total number of users and re-visiting users, within the predetermined period.

A Percentage of Hits with a Click Length of More than 120 Seconds

The percentage of hits with a click length of more than 120 seconds corresponds to a percentage of total user clicks lasting above 120 seconds vis-a-vis the total user clicks.

A Number of Users Per Month

The number of users per month corresponds to a total number of users who has accessed the web resource 128 within a month.

A Percentage of Unique Direct Hits from Mobile Devices

The percentage of unique direct hits from mobile devices correspond to a percentage of direct accesses (i.e. via entering the URL address of the web resource 128 into the command interface of the web browser 108 executed on a mobile device) vis-a-vis the total number of accesses from mobile devices.

A Percentage of Unique Direct Hits from Desktops;

The percentage of unique direct hits from desktops corresponds to a percentage of direct accesses (i.e. via entering the URL address of the web resource 128 into the command interface of the web browser 108 executed on a desktop device) vis-a-vis the total number of accesses from desktops.

A Logarithm of the Absolute Number of Direct Sessions from Desktops

The logarithm of the absolute number of direct sessions from desktops corresponds the logarithmic value of unique users (determined by, for example, the IP address) that access the web resource 128 from a desktop.

An Average Quality of Users on the Web Resource 128

The average quality of users on the web resource 128 corresponds to a ratio of real (human) user vis-a-vis non-human users visiting the web resource 128 (such as bots).

A share of outgoing traffic from the web resource 128 to an advertisement web resource The share of outgoing traffic from the web resource 128 to an advertisement web resource corresponds to a percentage of users selecting one or more ads included within the web resource 128.

In some non-limiting embodiments of the present technology, in response to receiving the set of features, the score determination routine 302 is configured to normalize each feature such that each feature has a value between 0 and 1. How each feature can be normalized to a value between 0 and 1 is known in the art and therefore will not be described herein.

In some non-limiting embodiments of the present technology, the score determination routine 302 is configured to execute a set of predictive algorithms 310.

Figure 4:
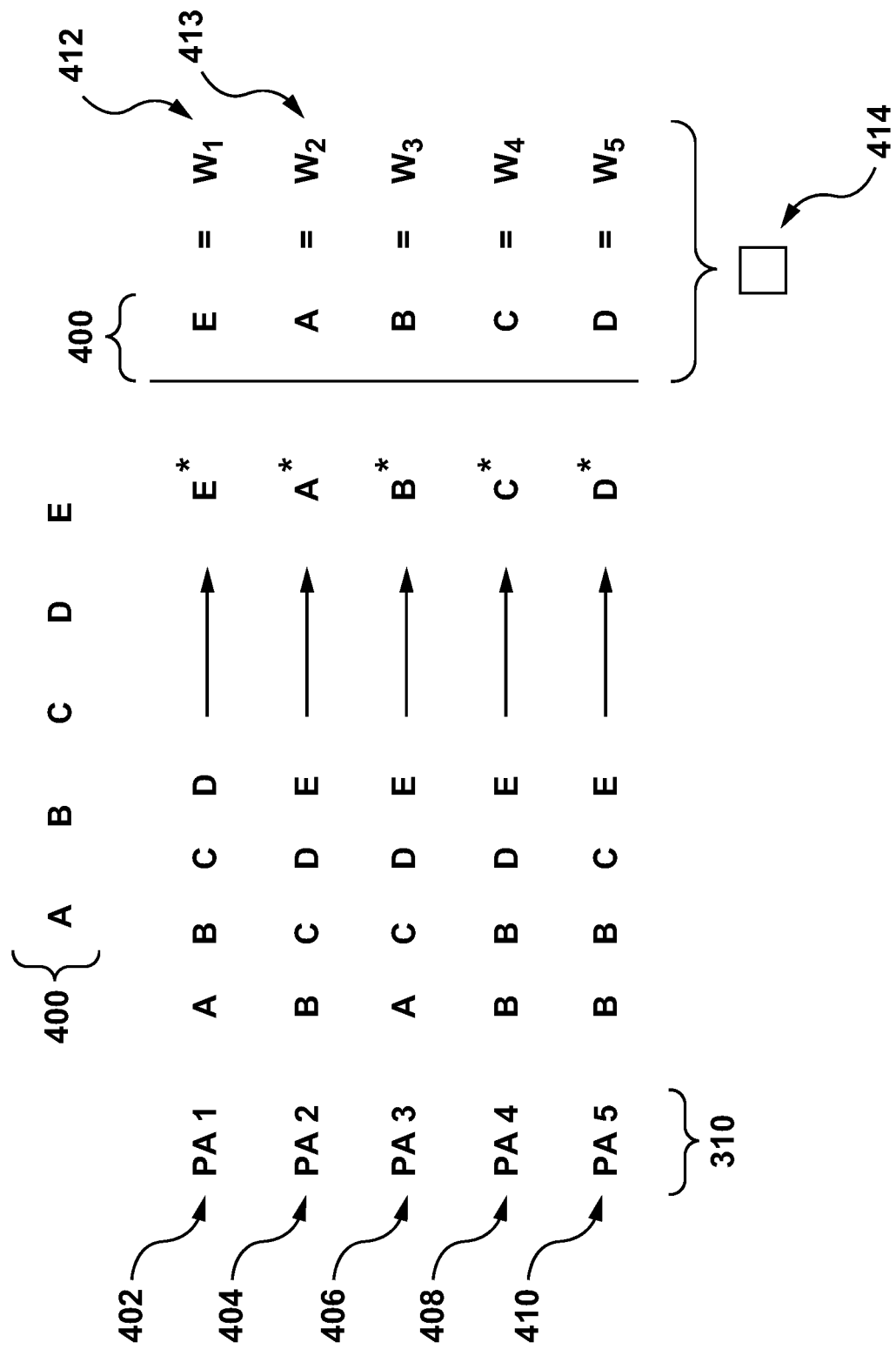
FIG. 4 is a schematic illustration of the functions of predictive algorithms executed in accordance with non-limiting embodiments of the present technology.

Referring to FIG. 4, the function of the set of predictive algorithms 310 is explained.

Let us assume, for example, that the data packet 308 includes a set of features 400 with 5 features (each denoted as a single letter A, B, C, D and E for ease of illustration only, but which features can be picked from the list described above). Accordingly, the set of predictive algorithms 310 includes 5 predictive algorithms, namely a first predictive algorithm 402, a second predictive algorithm 404, a third predictive algorithm 406, a fourth predictive algorithm 408 and a fifth predictive algorithm 410.

Each predictive algorithm of the set of predictive algorithms 310 is configured to generate a predicted feature value for a given feature of the set of features based on the remainder of the features of the set of features.

For example, the first predictive algorithm 402 is configured to predict the feature value of E (denoted as E*) based on the features A, B, C and D. The second predictive algorithm 404 is configured to predict the feature value of A (denoted as A*) based on the features B, C, D and E, and so on.

Once the predicted feature values (i.e. E*, A*, B*, C*, and D*) are calculated, the score determination routine 302 is configured to compare the predicted feature values with the actual feature values. For example, the predicted feature value E* is compared to the actual feature value E.

In some non-limiting embodiments of the present technology, the score determination routine 302 is configured to assign a weight value for each of the predictive algorithms based on the difference in value between a given predicted feature value and its actual feature value. For example, the score determination routine 302 is configured to calculate a first weight value 412, which is indicative of how well the feature value E correlates to the reminder of the features of the set of features (i.e. features A, B, C and D). Similarly, the score determination routine 302 is configured to calculate a second weight value 413, which is indicative of how well the feature value A correlates to the reminder of the features of the set of features (i.e. B, C, D and E), and so on.

In some non-limiting embodiments of the present technology, if a given feature value correlates well to the reminder of the features, the assigned weight is higher than if the given feature value does not correlate well with the reminder of the features. For example, let us assume that the feature value E correlates well with the reminder of the features of the set of features, but the feature value A does not correlate well with the reminder of the features. In such a case, the first weight value 412 will be higher (i.e. have more weight) than the second weight feature 414.

How the weight value is implemented is not limited. It is contemplated that the weight value corresponds to a difference in value between the given predicted feature value and its actual feature value (or normalized value thereof).

In some non-limiting embodiments of the present technology, the score determination routine 302 is then configured to calculate a raw quality score 414 based on the associated weight values. In some non-limiting embodiments of the present technology, the raw quality score 414 corresponds to a sum of the weighted values, as an example. The raw quality score 414 represents a perceived quality of the web resource 128 by a plurality of users, based on statistical information of interactions of the plurality of users with the web resource 128.

Needless to say, although the set of features 400 is illustrated as including only 5 features, this is done for ease of understanding. It should be understood that the set of features 400 may include more or fewer than 5 features.

Returning to FIG. 3, the score determination routine 302 is configured to transmit a data packet 312 to the mapping routine 304. The data packet 312 comprises the raw quality score 414.

Figure 5:
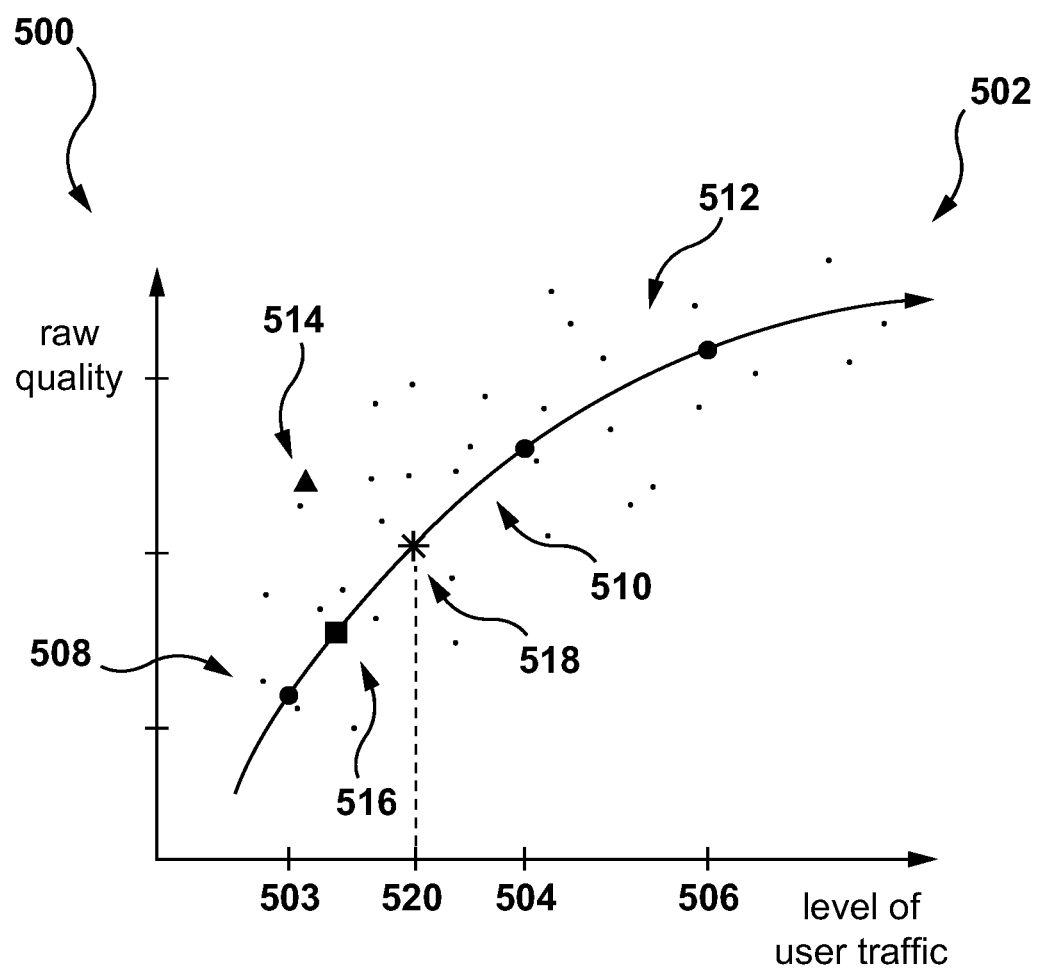
FIG. 5 is a schematic graph that is generated in accordance with a first non-limiting embodiment of the present technology.

Referring to FIG. 5, in response to receiving the data packet 312, the mapping routine 304 is configured to map the raw quality score 414 unto a graph 500.

The graph 500 illustrates a function of the raw quality score (the y-axis) vis-a-vis a level of user traffic (x-axis). The level of user traffic may correspond to, for example, monthly active users (MAU), the weekly active users (WAU); and daily active users (DAU).

The graph 500 includes a trend curve 502. How the trend curve 502 is generated is not limited. In some non-limiting embodiments of the present technology, one or more operators of the search engine application 124 selects a plurality of training web resources that have a raw quality score (as determined by the score determination routine 302) that is close or corresponds to an objective quality score (as determined by the operator(s)) of the associated web resource.

Once, the plurality of raw quality scores of the training web resources (illustrated as dots) are plotted unto the graph 500, the mapping routine 304 is then configured to generate the trend curve 502. In some embodiments of the present technology, the trend curve 502 is a logarithmic trend curve having a formula:

$$f(x)=a*np \cdot \log(b*x+c) \quad \text{(Function 1)}.$$

where:
a is a vertical shift parameter;
b is a sharpness parameter of the trend curve; and
c is a horizontal shift parameter.

The trend curve 502 may also be referenced as a reference curve, meaning that the trend curve 502 passes through a respective reference score at a given level of user traffic. For example, at a first level of traffic 503, the reference score corresponds to a first reference score 508, illustrated as a black circle on the trend curve 502. Similarly, at a second level of traffic 504, the reference score corresponds to a second reference score 510 on the trend curve 502. Finally, at a third level of traffic 506, the reference score corresponds to a third reference score 512 on the trend curve 502.

The mapping routine 304 is configured to map the raw quality score 414 unto the graph 500 vis-a-vis the level of user traffic associated with the web resource 128.

The mapping routine 304 is then configured to transmit a data packet 314 to the adjustment routine 306 (see FIG. 3). The data packet 314 comprises the graph 500 with the raw quality score 414 mapped unto it.

Upon receiving the data packet 314, the adjustment routine 306 is configured to determine if there is an offset between the raw quality score 414 and a reference score of the trend curve 502.

For example, let us assume that the raw quality score 414 is mapped unto the graph 500 at a first point 514 (illustrated as a triangle) which is offset in a vertical direction from a point on the trend curve 502 that corresponds to a reference score 516 (illustrated as a square). In other words, there is an offset between the perceived quality of the web resource 128 (i.e. the raw quality score 414) and the objective quality score for a web resource that has a similar level of user traffic, which is indicative that the perceived quality of the web resource 128 is above the objective quality score for a web resource with a similar level of user traffic.

In response to determining that an offset exists between the raw quality score 414 and the reference score 516, the adjustment routine 306 is configured to apply an offset adjustment formula to the raw quality score 414 to obtain an adjustment quality score. In some non-limiting embodiments of the present technology, the offset adjustment formula corresponds to:

$$\text{raw\_score}-(1-a)*(f(\text{visitors})-\text{raw\_score})*b/\text{std}(\text{raw\_score})*(\text{visitors}*c)/(d*10) \quad \text{(Function 2)},$$

where:
raw_score corresponds to the raw quality score 414;
visitors correspond to the level of user traffic;
a, b, c and d are predetermined values How the values, a, b, c and d are determined is not limited. In some non-limiting embodiments of the present technology, the values may be determined by one or more human assessors that have previously adjusted training raw quality scores that were offset to their respective reference score In some non-limiting embodiments of the present technology, the values of a,b,c, and d can be empirically selected by the human assessors based on a pre-determined pool of web resources, such as 100 web resources, 200 web resources, or the like. In some embodiments of the present technology, the human assessors determine the values of a,b,c, and d such as the Function 2 best predicts an adjustment offset between the raw scores for each of the pre-determined pool of web resources and the reference score. It is further noted that in some non-limiting embodiments of the present technology, the values of a,b,c, and d are not "learnt" based on the raw scores or other features of the web resources from the pre-determined pool of web resources. In these non-limiting embodiments of the present technology, a technical result is achieved whereby the values of a,b,c, and d are not overfitted (or in other words do not become biased) towards other metrics of the quality of the web resources of the pre-determined pool of web resources. In a sense, the output of the Function 2 becomes an orthogonal quality signal to the features on which the raw quality score is based on.

Now, let us assume for example, that the adjusted quality score of the raw quality score 414 corresponds to a second point 518 on the trend curve 502 (illustrated as an asterisk). In other words, the adjustment routine 306 determines that the web resource 128's objective quality score should be close to a fourth level of traffic 520 associated with the second point 518.

Accordingly, the adjustment routine 306 is configured to cause the search engine application 124 to increase the ranking of the web resource 128 on SERPs that will be generated on future queries, such that the level of traffic gets closer to the fourth level of traffic 520. It could be therefore said that the adjusted quality score (i.e. the second point 518) causes a future raw quality score to be closer to a future reference score (corresponding to the adjusted quality score) associated with a future level of user traffic (i.e. the fourth level of traffic 520).

Indeed, by increasing the ranking of the web resource 128 on SERPs, it is assumed that more users will access the web resource 128, therefore increase the level of user traffic.

Although in the illustration of FIG. 5, the explanation has been made with reference to the raw quality score 414 being offset above the trend curve 502, it is understood that it is not limited as such.

Figure 6:
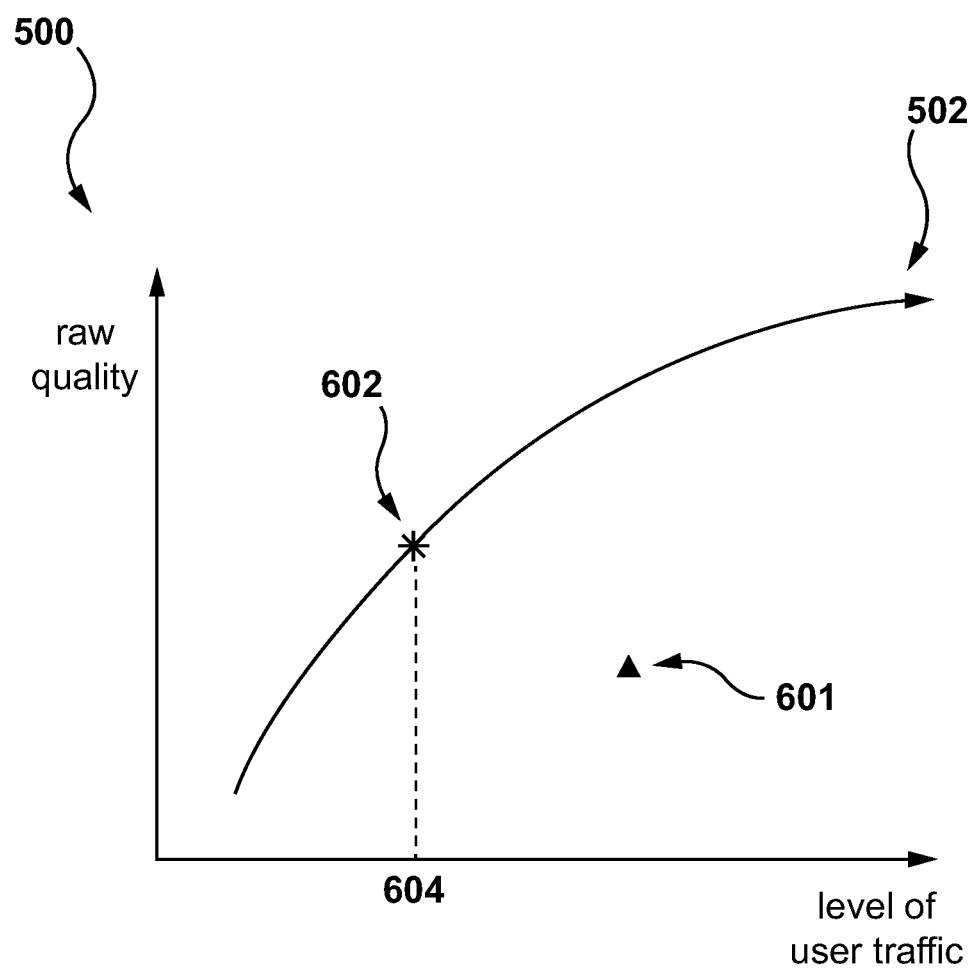
FIG. 6 is a schematic graph that is generated in accordance with a second non-limiting embodiment of the present technology.

For example, with reference to FIG. 6, there is illustrated the raw quality score 414 mapped unto the graph 500 at a first point 601 (illustrated as a triangle). The first point 601 is vertically offset from a reference score of the trend curve 502 at the same level of user traffic. More specifically, the first point 601 being below the trend curve 502 is indicative that the perceived quality of the web resource (i.e. the raw quality score 414) is lower than the objective quality score of a web resource with a similar level of user traffic.

The adjustment routine 306 is then configured to calculate the adjusted quality score of the raw quality score 414. Let us assume for example that the adjusted quality score corresponds to a second point 602 on the trend curve 502 (illustrated as an asterisk). In other words, the adjustment routine 306 determines that the web resource 128's objective quality score should be close to a level of traffic 604 associated with the second point 602.

Accordingly, the search engine application 124 is configured to decrease the ranking of the web resource 128 on SERPs that will be generated on future queries, such that the level of traffic gets closer the level of traffic 604. Indeed, by decreasing the ranking of the web resource 128 on SERPs, it is assumed that less users will access the web resource 128, and therefore decrease the level of user traffic.

Figure 7:
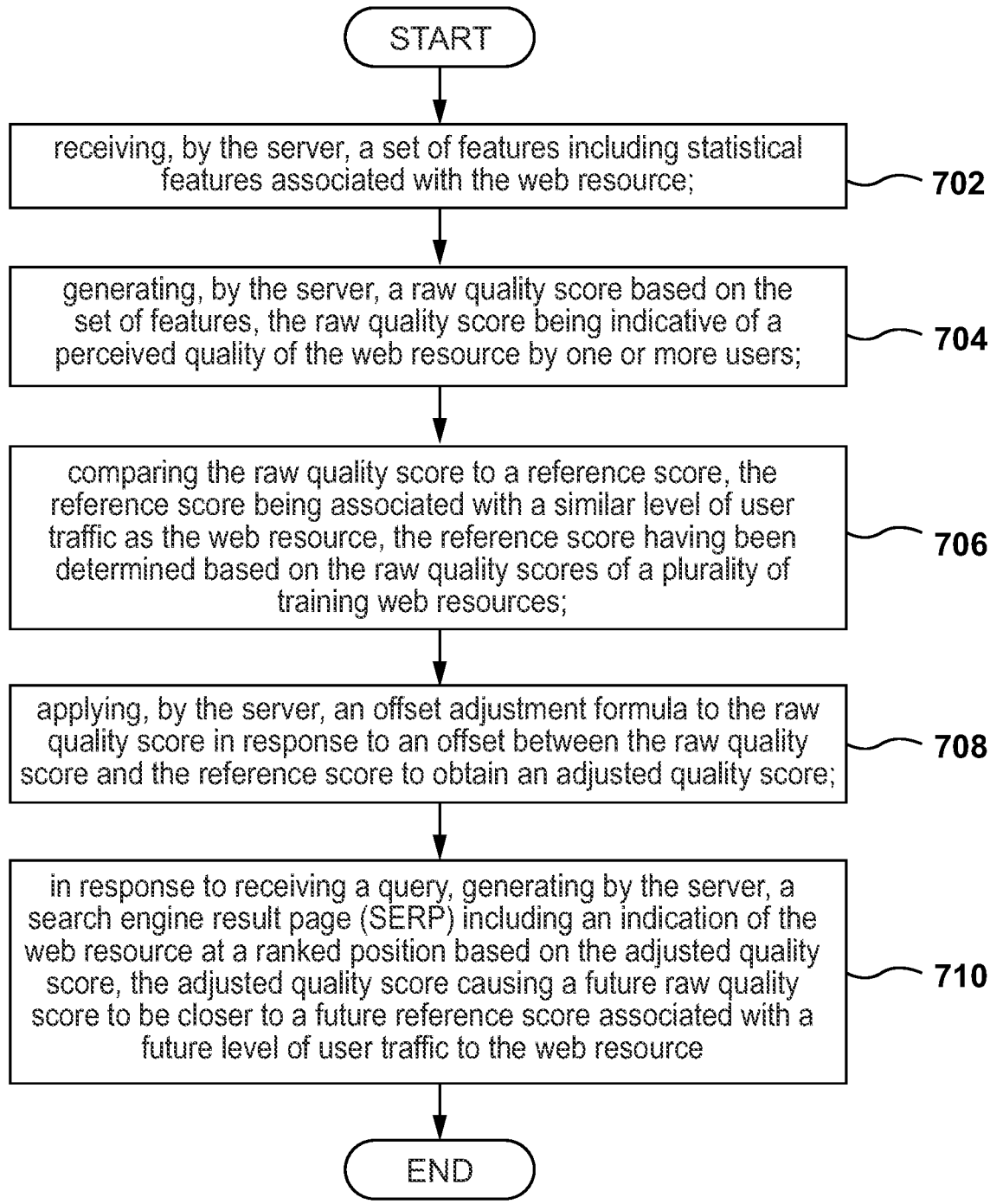
FIG. 7 depicts a block diagram of a flow chart of a method for ranking a web resource.

Given the architecture and examples provided hereinabove, it is possible to execute a computer-implemented method of classifying a word as an obscene word. With reference to FIG. 7, there is depicted a flow chart of a method 700, the method 700 being executable in accordance with non-limiting embodiments of the present technology. The method 700 can be executed by the server 118.

Step 702: receiving, by the server, a set of features including statistical features associated with the web resource;

The method 700 begins with step 702, with the score determination routine 302 receiving the data packet 308 from the web server 126. The data packet 308 comprises the set of features associated with the web resource 128.

In some non-limiting embodiments of the present technology, the set of features associated with the web resource 128 include one or more of the following:
  a quality of the web resource 128;
  a monthly user return rate;
  a long-term attachment of users to the web resource;
  a percentage of hits with a click length of more than 120 seconds;
  a number of users per month;
  a percentage of unique direct hits from mobile devices;
  a percentage of unique direct hits from desktops;
  a logarithm of the absolute number of direct sessions from desktops;
  an average quality of users on the web resource 128; and
  a share of outgoing traffic from the web resource 128 to an advertisement web resource.

Step 704: generating, by the server, a raw quality score based on the set of features, the raw quality score being indicative of a perceived quality of the web resource by one or more users;

At step 704, in response to receiving the data packet 308, the score determination routine 302 is configured to execute the set of predictive algorithms 310.

Let us assume, for example, that the data packet 308 includes the set of features 400 with 5 features (each denoted as a single letter A, B, C, D and E for ease of illustration only, but which features can be picked from the list described above). Accordingly, the set of predictive algorithms 310 includes 5 predictive algorithms, namely the first predictive algorithm 402, the second predictive algorithm 404, the third predictive algorithm 406, the fourth predictive algorithm 408 and the fifth predictive algorithm 410.

Each predictive algorithm of the set of predictive algorithms 310 is configured to generate a predicted feature value for a given feature of the set of features based on the remainder of the features of the set of features.

For example, the first predictive algorithm 402 is configured to predict the feature value of E (denoted as E*) based on the features A, B, C and D. The second predictive algorithm 404 is configured to predict the feature value of A (denoted as A*) based on the features B, C, D and E, and so on.

Once the predicted feature values (i.e. E*, A*, B*, C*, and D*) are calculated, the score determination routine 302 is configured to compare the predicted feature values with the actual feature values. For example, the predicted feature value E* is compared to the actual feature value E.

In some non-limiting embodiments of the present technology, the score determination routine 302 is configured to assign a weight value for each of the predictive algorithms based on the difference in value between a given predicted feature value and its actual feature value. For example, the score determination routine 302 is configured to calculate a first weight value 412, which is indicative of how well the feature value E correlates to the reminder of the features of the set of features (i.e. features A, B, C and D). Similarly, the score determination routine 302 is configured to calculate a second weight value 413, which is indicative of how well the feature value A correlates to the remainder of the features of the set of features (i.e. B, C, D and E), and so on.

In some non-limiting embodiments of the present technology, the score determination routine 302 is then configured to calculate a raw quality score 414 based on the associated weight values. In some non-limiting embodiments of the present technology, the raw quality score 414 corresponds to a sum of the weighted values, as an example. The raw quality score 414 represents a perceived quality of the web resource 128 by a plurality of users, based on statistical information of interactions of the plurality of users with the web resource 128.

Step 706: comparing the raw quality score to a reference score, the reference score being associated with a similar level of user traffic as the web resource, the reference score having been determined based on the raw quality scores of a plurality of training web resources;

At step 706, the mapping routine 304 is configured to map the raw quality score 414 unto the graph 500 vis-a-vis the level of user traffic associated with the web resource 128.

For example, let us assume that the raw quality score 414 is mapped unto the graph 500 at a first point 514 (illustrated as a triangle) which is offset in a vertical direction from a point on the trend curve 502 that corresponds to a reference score 516 (illustrated as a square). In other words, there is an offset between the perceived quality of the web resource 128 (i.e. the raw quality score 414) and the objective quality score for a web resource that has a similar level of user traffic, which is indicative that the perceived quality of the web resource 128 is above the objective quality score for a web resource with a similar level of user traffic.

Step 708: applying, by the server, an offset adjustment formula to the raw quality score in response to an offset between the raw quality score and the reference score to obtain an adjusted quality score;

At step 708, in response to determining that an offset exists between the raw quality score 414 and the reference score 516, the adjustment routine 306 is configured to apply an offset adjustment formula to the raw quality score 414 to obtain an adjustment quality score. In some non-limiting embodiments of the present technology, the offset adjustment formula corresponds to:

$$\text{raw\_score} - (1-a)*(f(\text{visitors}) - \text{raw\_score})*b/\text{std}(\text{raw\_score})*(\text{visitors}*c)/(d*10) \quad \text{(Function 2),}$$

where:
raw_score corresponds to the raw quality score 414;
visitors correspond to the level of user traffic; and
a, b, c and d are predetermined values.

Now, let us assume for example, that the adjusted quality score of the raw quality score 414 corresponds to a second point 518 on the trend curve 502 (illustrated as an asterisk). In other words, the adjustment routine 306 determines that the web resource 128's objective quality score should be close to a fourth level of traffic 520 associated with the second point 518

Step 710: in response to receiving a query, generating by the server, a search engine result page (SERF) including an indication of the web resource at a ranked position based on the adjusted quality score, the adjusted quality score causing a future raw_quality score to be closer to a future reference score associated with a future level of user traffic to the web resource At step 710, the adjustment routine 306 is configured to cause the search engine application 124 to increase the ranking of the web resource 128 on SERPs that will be generated on future queries, such that the level of traffic gets closer to the fourth level of traffic 520. It could be therefore said that the adjusted quality score (i.e. the second point 518) causes a future raw quality score to be closer to a future reference score (corresponding to the adjusted quality score) associated with a future level of user traffic (i.e. the fourth level of traffic 520).

Indeed, by increasing the ranking of the web resource 128 on SERPs, it is assumed that more users will access the web resource 128, therefore increase the level of user traffic.

It should be apparent to those skilled in the art that at least some embodiments of the present technology aim to expand a range of technical solutions for addressing a particular technical problem, namely ranking a web resource in a SERP.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method for ranking a web resource, the method executable by a search engine server, the method comprising, at an in-use phase:
    receiving, by the server, a set of features including statistical features associated with the web resource;
    generating, by the server, a raw quality score based on the set of features, the raw quality score being indicative of a perceived quality of the web resource by one or more users;
    comparing the raw quality score to a reference score, the reference score being associated with a similar level of user traffic as the web resource, the reference score having been determined based on the raw quality scores of a plurality of training web resources;
    applying, by the server, an offset adjustment formula to the raw quality score in response to an offset between the raw quality score and the reference score to obtain an adjusted quality score;
    in response to receiving a query, generating by the server, a search engine result page (SERP) including an indication of the web resource at a ranked position based on the adjusted quality score, the adjusted quality score causing a future raw quality score to be closer to a future reference score associated with a future level of user traffic to the web resource.

2. The method of claim 1, wherein the generating the raw quality score comprises:
    executing, by the server, a set of predictive algorithms, each predictive algorithm configured to generate a predicted feature value for a given feature from the set of features based on a remainder of the features;
    determining, by the server, a weight value for each predictive algorithm, the weight value being indicative of how well a given feature value correlates to the remainder of the features of the set of features; and
    calculating, by the server, the raw quality scores based on the set of features and the associated weight value.

3. The method of claim 2, wherein determining the reference score comprises:
    plotting the raw quality scores of the plurality of training web resources on a graph associated with a respective level of traffic; and
    generating a trend curve fitting the raw quality scores on the graph, the trend curve passing through a set of reference scores, the set of reference scores including reference scores at each level of traffic.

4. The method of claim 3, wherein the trend curve is based on the formula $f(x)=a*\log(b*x+c)$, where:
    a is a vertical shift parameter;
    b is a sharpness parameter of the trend curve; and
    c is a horizontal shift parameter.

5. The method of claim 1, wherein the offset adjustment formula is:

$$\text{raw\_score} - (1-a)*(f(\text{visitors}) - \text{raw\_score})*b/\text{std}(\text{raw\_score})*\text{visitors}*c)/(d*10), \text{ where:}$$

raw_score corresponds to the raw quality score;
visitors correspond to a monthly user return rate; and
a, b, c and d are predetermined values.

6. The method of claim 1, wherein the set of features comprises at least one of:
   a quality of the web resource;
   a monthly user return rate;
   a long-term attachment of users to the web resource;
   a percentage of hits with a click length of more than 120 seconds;
   a number of users per month;
   a percentage of unique direct hits from mobile devices;
   a percentage of unique direct hits from desktops;
   a logarithm of an absolute number of direct sessions from desktops;
   an average quality of users on a host; and
   a share of outgoing traffic from the host to an advertisement.

7. The method of claim 6, the method further comprising normalizing each feature within the set of features between a value of 0 and 1.

8. The method of claim 1, wherein the similar level of user traffic is measured by one of:
   monthly active users (MAU);
   weekly active users (WAU); and
   daily active users (DAU).

9. The method of claim 1, wherein causing the future raw quality score to be closer to the future reference score comprises:
   in response to the raw quality score being above the reference score, the adjusted quality score causing the ranked position to be below a ranked position associated with the raw quality score; and
   in response to the raw quality score being below the reference score, the adjusted quality score causing the ranked position to be above the ranked position associated with the raw quality score.

10. A server for ranking a web resource, the server comprising a processor configured to, at an in-use phase:
    receive, a set of features including statistical features associated with the web resource;
    generate, a raw quality score based on the set of features, the raw quality score being indicative of a perceived quality of the web resource by one or more users;
    compare the raw quality score to a reference score, the reference score being associated with a similar level of user traffic as the web resource, the reference score having been determined based on the raw quality scores of a plurality of training web resources;
    apply an offset adjustment formula to the raw quality score in response to an offset between the raw quality score and the reference score to obtain an adjusted quality score;
    in response to receiving a query, generate a search engine result page (SERP) including an indication of the web resource at a ranked position based on the adjusted quality score, the adjusted quality score causing a future raw quality score to be closer to a future reference score associated with a future level of user traffic to the web resource.

11. The server of claim 10, wherein to generate the raw quality score, the processor is configured to:
    execute a set of predictive algorithms, each predictive algorithm configured to generate a predicted feature value for a given feature from the set of features based on a remainder of the features;
    determine a weight value for each predictive algorithm, the weight value being indicative of how well a given feature value correlates to the remainder of the features of the set of features; and
    calculate the raw quality scores based on the set of features and the associated weight value.

12. The server of claim 11, wherein to determine the reference score, the processor is configured to:
    plot the raw quality scores of the plurality of training web resources on a graph associated with a respective level of traffic; and
    generate a trend curve fitting the raw quality scores on the graph, the trend curve passing through a set of reference scores, the set of reference scores including reference scores at each level of traffic.

13. The server of claim 12, wherein the trend curve is based on the formula f(x)=a*log (b*x+c), where:
    a is a vertical shift parameter;
    b is a sharpness parameter of the trend curve; and
    c is a horizontal shift parameter.

14. The server of claim 10, wherein the offset adjustment formula is:

raw_score−(1−$a$)*($f$(visitors)−raw_score)*$b$/std(raw_score)*(visitors*$c$)/($d$*10), where:
   raw_score corresponds to the raw quality score;
   visitors correspond to a monthly user return rate; and
   a, b, c and d are predetermined values.

15. The server of claim 10, wherein the set of features comprises at least one of:
    a quality of the web resource;
    a monthly user return rate;
    a long-term attachment of users to the web resource;
    a percentage of hits with a click length of more than 120 seconds;
    a number of users per month;
    a percentage of unique direct hits from mobile devices;
    a percentage of unique direct hits from desktops;
    a logarithm of an absolute number of direct sessions from desktops;
    an average quality of users on a host; and
    a share of outgoing traffic from the host to an advertisement.

16. The server of claim 15, the processor being further configured to normalize each feature within the set of features between a value of 0 and 1.

17. The server of claim 10, wherein the similar level of user traffic is measured by one of:
    monthly active users (MAU);
    weekly active users (WAU); and
    daily active users (DAU).

18. The server of claim 10, wherein to cause the future raw quality score to be closer to the future reference score, the processor is configured to:
    in response to the raw quality score being above the reference score, the adjusted quality score causing the ranked position to be below a ranked position associated with the raw quality score; and
    in response to the raw quality score being below the reference score, the adjusted quality score causing the ranked position to be above the ranked position associated with the raw quality score.

* * * * *